United States Patent [19]

De Jong

[11] 4,239,095
[45] Dec. 16, 1980

[54] SLIP BAND ELECTROMECHANICAL CLUTCH

[75] Inventor: Allen W. De Jong, Chatham, Canada

[73] Assignee: Canadian Fram Limited, Chatham, Canada

[21] Appl. No.: 951,103

[22] Filed: Oct. 13, 1978

[51] Int. Cl.³ .................. F16D 27/02; F16D 47/00
[52] U.S. Cl. .................................. 192/84 T; 192/48.3
[58] Field of Search ........................ 192/48.3, 84 T

[56] References Cited

U.S. PATENT DOCUMENTS

| 870,166 | 11/1907 | Harter | 192/84 T |
| 1,886,692 | 11/1932 | Kapitza et al. | 192/84 T X |
| 3,129,798 | 4/1964 | Rabinow | 192/84 T |

Primary Examiner—Allan D. Herrmann
Attorney, Agent, or Firm—Ken C. Decker; William N. Antonis

[57] ABSTRACT

An electromechanical clutch for vehicle engine cooling fans includes a driving member mounted for rotation by the vehicle engine and a driven member rotatably mounted on the driving member. The driven member carries the engine cooling fan, and the driving member houses a magnetic coil which is energized to actuate the clutch. The driving and driven members define a circumferentially extending gap therebetween. A band is disposed within the gap, and includes an inner band member made of electromagnetic material and an outer band member comprising a resilient member with a frictional material attached to the outer circumference thereof. The inner and outer band members are joined together so that the inner and outer band members may move radially relative to one another while actuation forces may be transmitted from the inner to the outer band to the connection therebetween. When the clutch is engaged, the inner band member is drawn into driving engagement with the driving member by energization of the electromagnetic coil. Accordingly, actuation forces are transmitted from the driving member to the driven member through the inner band member and the outer band member. However, since only a frictional engagement exists between the outer band member and the driven member, the outer band member is permitted to slip relative to the driven member, thereby accommodating any torque overload condition.

21 Claims, 3 Drawing Figures

SLIP BAND ELECTROMECHANICAL CLUTCH

BACKGROUND OF THE INVENTION

This invention relates to an electromechanical clutch for an engine cooling fan.

Experience has conclusively demonstrated that operation of the engine cooling fan is necessary only during a relatively small percentage of the time that a vehicle engine is operated. If the fan is driven when it is not necessary, the power used to rotate the fan is wasted, thereby increasing gasoline consumption. Accordingly, it is desirable to provide a fan clutch which disconnects the cooling fan during certain engine operating conditions. Such a fan clutch design is disclosed in my prior U.S. patent application Ser. No. 900,829, filed April 28, 1978, assigned to the assignee of the present invention and incorporated herein by reference. This device disclosed in my prior patent application uses an electromagnetic coil which, when energized, draws a magnetic band into driving engagement with the driven member to thereby transmit torque to the driven member which carries the cooling fan. Although the device disclosed in this prior application works quite well, it is desirable to assure that any slippage that occurs between the various components upon engagement of the clutch be properly accommodated, since such slippage in certain instances can cause premature wear of some of the components.

SUMMARY OF THE INVENTION

Accordingly, an important object of my invention is to provide an electromechanical fan clutch control which accommodates torque overload conditions upon engagement of the clutch by permitting controlled slippage with the driven member.

Still another important object of my invention is to increase the life of various components of engine fan clutches actuated by electromagnetic forces by preventing slippage between wearing members and by permitting slippage where it can be accommodated.

Still another important object of my invention is to provide a fan clutch which can be designed for a predetermined initial or engagement torque and for a predetermined maximum torque capability.

DETAILED DESCRIPTION

Figure 1:
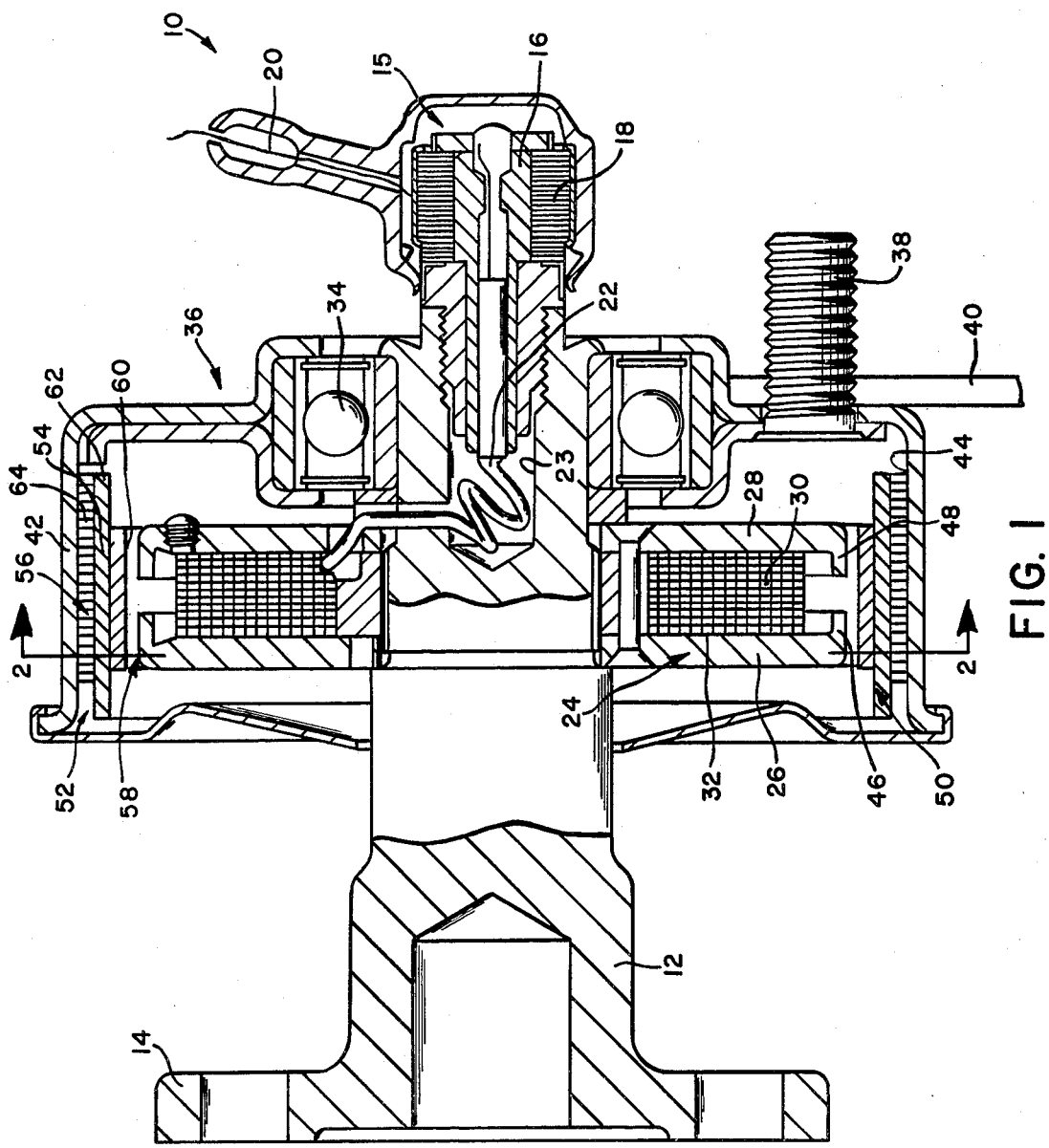
FIG. 1 is an actual cross-sectional view of a clutch and fan assembly made pursuant to the teachings of my present invention.

Referring now to the drawing, a clutch and fan assembly generally indicated by the numeral 10 includes a driving member 12 which terminates in a flange 14 for connection with the vehicle engine (not shown), so that the driving member 12 is rotated by operation of the engine. The other end of the driving member 12 carries a slip ring assembly generally indicated by the number 15. The slip ring assembly includes a member 16 which is fixed for rotation with the driving member 12 and a slip member 18 which is mounted so that the member 16 can rotate relative to the member 18. Connecting wires 20, 22 extend from the members 18 and 16 respectively, so that an electrical connection is provided between the connecting wires 20 and 22 by the members 16 and 18 of the slip ring assembly 15. The connecting wire 20 is connected to appropriate vehicle engine temperature and/or air conditioning pressure sensors of a type well-known to those skilled in the art. Since these sensors are conventional, they will not be described in detail herein. The connecting wire 22 is carried within passage 23 in the driving member 12.

The driving member 12 also carries a circumferentially extending spool or bracket 24 which is made of magnetic material and which is mounted for rotation with the driving member 12. The spool or bracket 24 includes a pair of axially spaced, circumferentially extending pole piece portions 26, 28 which circumscribe the driving member 12 and which cooperate with one another to define a cavity 30 therebetween. An electromagnetic coil comprises windings 32 disposed in the cavity 30, which are wrapped circumferentially around the driving member 12. The windings 32 are connected with the connecting wire 22, so that when an electrical signal is transmitted through the connecting wire 20, electrical current will be transmitted to the coil 32 by the connecting wire 20, the slip ring 15, and the connecting wire 22.

A bearing 34 mounted on the driving member 12 between the bracket 24 and the slip ring assembly 15, mounts a driven member 36 for rotation relative to the driving member 12. Bolts 38 attach fan blades 40 to the driven member 36, so that the fan blades 40 are rotated with the driven member 36. Of course, it will be understood by those skilled in the art that additional fan blades 40 are spaced circumferentially around the periphery of the driven member 36 in a manner well-known to those skilled in the art. The driven member 36 further includes an axially extending portion 42 which projects from the driven member 36 and which circumscribes the pole piece portions 26 and 28 of the spool or bracket 24. The inner circumferential surface 44 of the portion 42 cooperates with the outer circumferential edges 46, 48 of the pole piece portions 26 and 28 to define a gap 50 therebetween. A circumferentially extending band 52 is disposed in the gap 50.

The band 52 includes an inner band member 54 and an outer band member generally indicated by the numeral 56. The inner band member 54 is made from magnetic material, as are the pole pieces 26, 28, so that a magnetic circuit is defined consisting of pole piece portions 26, 28, and the inner band member 54. The outer peripheral portions 58, 60 of the radially inner edge of the inner band member 54 are adapted to engage the outer circumferential edges 46, 48 of the pole piece portions 26, 28 when the clutch is engaged. Accordingly, it will be noted that the inner band member 54 bridges the cavity 30 in which the magnetic coil consisting of windings 32 is housed. The outer band member 56 includes a strip of resilient, nonmagnetic material 62 and a corresponding strip of a frictional material 64 which is bonded to the outer circumferential surface of the strip 62. The strip of frictional material 64 may be of any conventional type well-known to those skilled in the art. Assuming rotation of the members 12 and 36 in the direction indicated by the arrow "A", the ends 66 of the inner and outer band members 54, 56 are joined together by a rivet 68, but the ends generally indicated by the numeral 70 are free, to thereby permit the inner band member 54 to move radially in the gap 50 into and out of driving engagement with the driving member 12.

Figure 3:
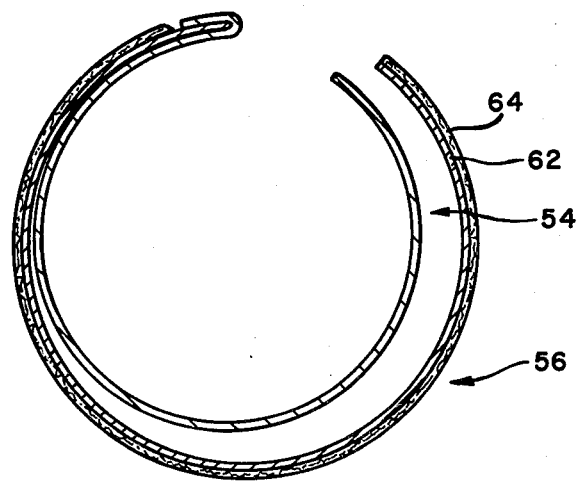
FIG. 3 is a plan view of the inner and outer band assembly used in my fan clutch in the position which they assume before installation in the clutch housing.

Referring now to FIG. 3, which illustrates the relaxed or free state of the inner and outer band members 54, 56 before they are installed in the clutch mechanism 10, it will be noted that the strip 62 assumes a relaxed or free shape which is different from the arcuate shape of the gap 50. Accordingly, when the inner and outer band members 54, 56 are installed in the gap 50, the resiliency of the strip 62 yieldably urges the strip of frictional material 64 which is bonded to the strip 62 into frictional engagement with the driven member 36.

MODE OF OPERATION

Figure 2:
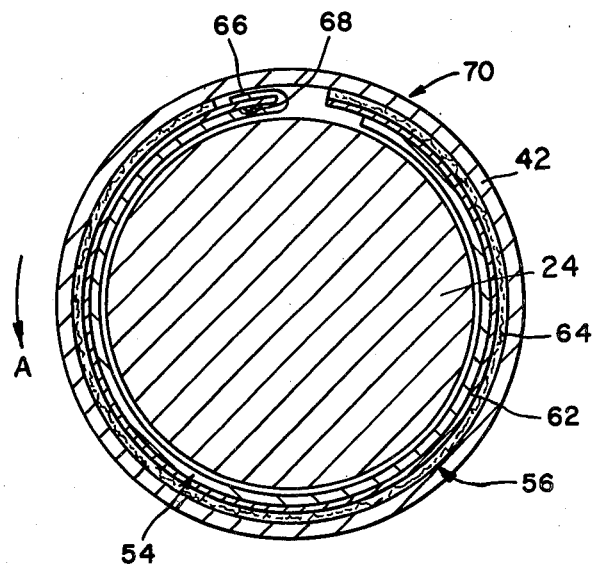
FIG. 2 is a cross-sectional view taken substantially along lines 2—2 of FIG. 1.

The various components of the clutch mechanism 10 are illustrated in the drawings in the position they assume when the clutch is disengaged. In this condition, the driving member 12, of course, will be rotated by the vehicle engine, but the driven member 36 will not be driven thereby, because there is no driving connection between the driving member 12 and the driven member 36 and the bearing 34 permits the driving member 12 to rotate without driving the driven member 36 unless the clutch mechanism is engaged. When the aforementioned temperature and/or pressure sensors (not shown) sense an engine operating condition in which operation of the engine cooling fan is required, an electrical signal is transmitted through the connecting wire 20 and 22 to energize the coil comprising the windings 32. When this occurs, magnetic flux created in the magnetic circuit defined by the pole piece portions 26, 28 and the inner band member 54 causes the latter to move radially, viewing FIG. 1 and 2, in a direction toward the pole pieces 26, 28. Consequently, the outer peripheral portions 58, 60 of the inner edge of the inner band member 52 will be brought into engagement with the outer circumferential edges 46, 48 of the pole piece portions 26, 28.

Forces exerted on the inner band member 54 due to engagement of the latter with the driving member 12 are transmitted to the outer band member 56 through the riveted connection 68. Because of the resiliency of the strip 62, the frictional material 64 is loaded against the driven member 36 with a predetermined force. Because of the transmission of the forces between the inner and outer band members 54 and 56, a servo action well-known to those skilled in the art occurs in which a relatively small actuating force is multiplied many times by the wrapping effect of the band members. Accordingly, the force with which the strip 64 is loaded against the driven member 36 is a function of this servo multiplied actuation force. Since the force required to initiate slippage between the strip of frictional material 64 and the driven member 36 is a function of the loading force, slippage will occur between the frictional material 64 and the driven member 36 upon engagement of the clutch if transmitted torque levels are greater than a predetermined maximum. Accordingly, slippage does not occur between the inner band member 54 and the pole pieces 36, 38, thereby avoiding the premature wear of these components which might be caused by slippage between them.

Therefore, the initial or engagement torque, which is the maximum torque which can be transmitted to the driven member 36 without slippage upon engagement of the clutch, is a function of (a) the coefficient of friction of the strip of friction material 64 (b) the resiliency of the strip 62, which regulates the radially outward force applied against the strip of friction material 64 due to the resiliency of the strip 62 and (c) the point of attachment of the inner band 54 to the outer band 56, i.e., the position of the rivet 68. The latter factor establishes the degree of force multiplication due to the servo action generated by the wrapping effect of the inner and outer bands 54 and 56 and is a function of the degree of wrap of the outer band 56 about the driving member 12. Accordingly, this degree of wrap, and thereby the extent of force multiplication, can be regulated by moving the point of attachment from the ends 66 of the band members 54, 56 to a point intermediate the ends 66 and the ends 70. Similarly, the maximum torque capability at the fully engaged speed is a function of the three factors discussed hereinabove which regulate the initial engagement torque. However, the maximum torque capability will also be a function of the centrifugal force exerted on the inner and outer band members 54, 56 by rotation of the members. Accordingly, the torque capability at the fully engaged speed may be increased by adding weight to the inner or outer band members 54, 56. Since centrifugal force is a function of weight, adding weight to the outer band members will increase the centrifugal force and will therefore increase the aforementioned loading of the frictional material 64 against the driven member 36. Accordingly, the additional force which must be generated between the strip 64 and the driven member 36 in order to induce slippage will be increased proportionately.

I claim:

1. In a clutch, a pair of coaxial, relatively rotatable members comprising a driving member and a driven member, a band wrapped around one of said members, electromagnetic means carried by said one member for urging the band into driving engagement with said one member, said band including means securing said band to said other member but permitting said band to slip relative to the other member upon engagement of the clutch, said securing means thereafter providing a driving connection between said members.

2. The invention of claim 1:
   wherein said securing means is a friction connection between said band and said other member.

3. The invention of claim 2:
   wherein said band includes relatively movable portions and means connecting said portions, one of said portions being adapted to be brought into driving engagement with said one member by said electromagnetic means, the other portion engaging said other member through said friction connection.

4. The invention of claim 3:
   wherein the relatively movable portions of the band are connected at a single point, whereby forces are transmitted between the bands at said single point.

5. The invention of claim 3:
   wherein said relatively rotatable members have corresponding radially offset portions defining a gap therebetween, said band being located in said gap, said relatively movable portions of said band including an outer band member and an inner band member.

6. The invention of claim 5:
   wherein said outer band member includes an outer circumferential friction surface adapted to engage the radial offset portion of said other member, and said inner band member is magnetic and is adapted to engage said radial offset portion of said one member when urged thereagainst by said electromagnetic means.

7. The invention of claim 6:
wherein said outer band member includes a resilient portion yieldably urging said friction surface into frictional engagement with the radial offset portion of said other member.

8. The invention of claim 7:
wherein said inner and outer band members have a pair of adjacent ends, said connecting means interconnecting said adjacent ends.

9. The invention of claim 7:
wherein each of said inner and outer band members have adjacent, opposite ends, said connecting means interconnecting said inner and outer band members at a point intermediate the opposite ends thereof.

10. The invention of claim 7:
wherein said gap defined between said radially offset portions has an arcuate shape and said resilient portion of said outer band is a strip of material having a free shape other than the arcuate shape of said gap, said strip assuming the arcuate shape of the gap when installed therein whereby the resiliency of said strip urges one side of the strip into engagement with the radial offset portion of said other member.

11. The invention of claim 6:
wherein said gap defined between said radially offset portions has an arcuate shape, and said outer band member includes a strip of resilient material and said friction surface comprises a friction material secured to one side of said gap, said strip having a free shape other than the arcuate shape of said gap, said strip assuming the arcuate shape of said gap when installed therein whereby the resiliency of said strip urges the friction material into frictional engagement with the radial offset portion of said other member.

12. The invention of claim 11:
wherein said inner band member is secured to said strip.

13. The invention of claim 11:
wherein one end of said inner band member is secured to a corresponding end of said strip.

14. In a clutch, a pair of inner and outer, coaxial, relatively rotatable members comprising a driving member and a driven member, said inner and outer members defining a radially extending gap therebetween, a band located in said gap, said band including inner and outer surfaces, electromagnetic means carried by said inner member for drawing the inner surfaces of the band into driving engagement with the outer circumferential surface of the inner member when the clutch is engaged, said outer surface of the band being secured to said outer member through a friction connection.

15. The invention of claim 14:
wherein said band includes an outer band member carrying said outer surfaces and an inner band member carrying said inner surface, said inner band member being secured to said outer band member, said outer band member being secured to said outer member through said friction connection.

16. The invention of claim 15:
wherein said inner band member is made from a magnetic material and the outer band member is made from a nonmagnetic material.

17. The invention of claim 15:
wherein one end of said outer band member is secured to a corresponding end of the inner band member.

18. The invention of claim 15:
wherein said outer surface comprises a layer of friction material fixedly secured to said outer band member.

19. The invention of claim 18:
wherein said outer band member includes a resilient portion yieldably urging said friction material into frictional engagement with said outer member.

20. The invention of claim 15:
wherein said gap defined between the inner and outer members has an arcuate shape, said outer band member including a resilient strip having a free shape other than the arcuate shape of said gap, said strip assuming the arcuate shape of said gap when installed therein whereby the resiliency of said strip urges one side of said strip into frictional engagement with said outer member to thereby establish said friction connection.

21. The invention of claim 15:
wherein said gap defined between the inner and outer members has an arcuate shape, said outer member including a strip of resilient material with a frictional material attached to one side thereof, said strip having a free shape other than the arcuate shape of said gap, said strip assuming the arcuate shape of said gap when installed therein whereby the resiliency of said strip urges said frictional material into frictional engagement with said outer member to thereby establish said friction connection.

* * * * *